UNITED STATES PATENT OFFICE.

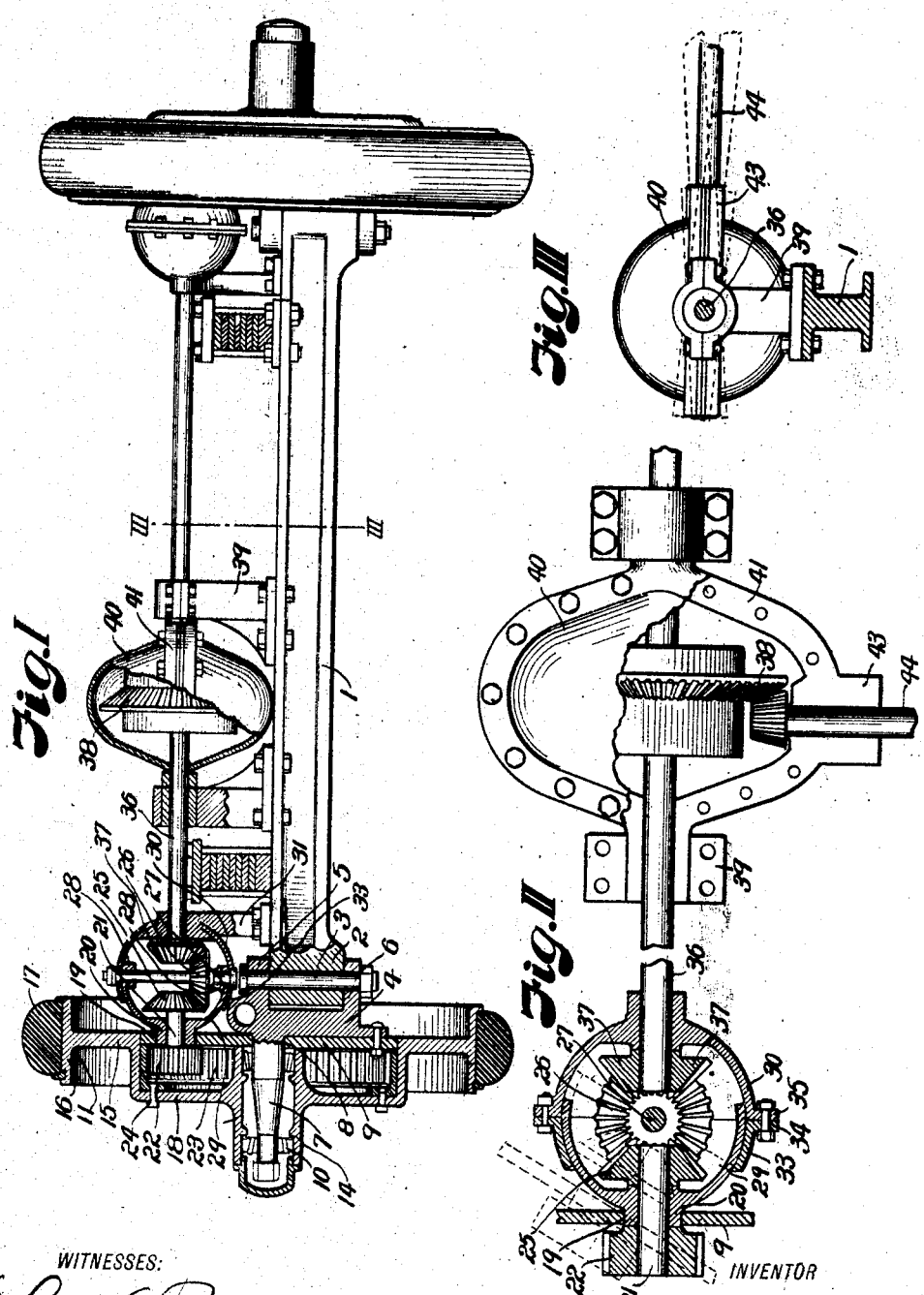

THEODORE DITMARS, OF KANSAS CITY, MISSOURI.

DRIVING MECHANISM.

1,174,399.  Specification of Letters Patent.  Patented Mar. 7, 1916.

Application filed January 20, 1915. Serial No. 3,277.

*To all whom it may concern:*

Be it known that I, THEODORE DITMARS, a citizen of the United States, residing at Kansas City, in the county of Jackson and State of Missouri, have invented certain new and useful Improvements in Driving Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to driving mechanism for motor vehicles, and has for its object to provide mechanism whereby power may be applied to each of the wheels individually without interfering with the steering mechanism.

A further object of the invention is to provide driving mechanism wherein the universal joint is eliminated.

In accomplishing these objects I have provided the details of structure hereinafter described and illustrated in the accompanying drawings, wherein:—

Figure I is an elevation of the axle, wheels and driving mechanism mounted thereon, parts being in vertical section. Fig. II is a plan view of the driving gearing and differential gearing shown partly in section. Fig. III is a vertical section on the line III—III, Fig. I, illustrating the revoluble mounting of the differential case.

Referring more in detail to the drawings:—1 designates either the front or rear axle of an automobile constructed according to my invention, and preferably of the I-beam type that is provided with knuckles 2 for receiving the vertical pins 3. Revolubly mounted on the pins 3 are steering yokes 4, each provided with an upper and a lower yoke arm 5—6 adapted for receiving the axle knuckle 2 and vertical pins 3. Integrally formed with the yokes 4 are laterally directed spindles 7 which are projected outwardly through central apertures 8 in disks 9 to which the said yokes are rigidly bolted or otherwise secured. The spindles 7 are provided with anti-friction members 10 and supported thereon are the wheels 11. The wheels 11 are preferably cast to form an integrally formed hub 14 and body portion 15, the latter having peripheral flanges 16 on which is mounted a tire 17 of any suitable kind. Cast concentrically with the periphery of the wheel and forming a part of the body portion is an inwardly opening drum 18 within which the disk 9 is closely and revolubly fitted. Rigidly secured within an aperture 19 in the disk 9 is a bearing 20 within which is revolubly mounted a stub shaft 21 which projects within the drum case and carries a spur gear 22 which meshes with a toothed band 23 that is secured to the outer face of the drum by means of bolts 24. Mounted on the inner end of the stub shaft 21 is a bevel gear 25 that meshes with an idler gear 26 revolubly mounted on a shaft 27. The shaft 27 is supported in vertical alinement with the pins 3 in bearings 28 formed integrally with a semi-spherical member 29; the said part 29 forming a part of the bearing 20 and is adapted for fitting within a semi-spherical socket 30 having a supporting standard 31 integrally formed therewith. The two semi-spherical portions are designed to form a casing for the gearing; the part 29 being adapted for horizontal turning movement within the outer portion and is secured therein by means of a band 33 having an outturned flange 34 that is bolted to a similar flange 35 on the socket member 30. Revolubly mounted in the standards 31 and extending to the differential case presently described are drive shafts 36 which project into the socket members and carry gear wheels 37 which mesh with the idler 26 in order that power may be applied to the wheels.

In order that a universal joint may be eliminated between the motor and differential gearing 38, I provide standards 39 within which the differential case 40 may be revolubly supported; the said case being reinforced by means of heavy bands 41 bolted thereto and which also provide means for an extended bearing 43 for the main drive shaft 44. It will be seen that by so constructing the parts a universal joint is eliminated between the differential gearing and each wheel and also by mounting the differential gearing in a revolubly supported case the drive shaft may be inclined at different angles without binding on the gears or other parts.

Having thus described my invention, what I claim as new therein and desire to secure by Letters-Patent, is:

1. The combination with an axle, of a knuckle pivotally mounted at each end of the axle, and provided with a spindle, a wheel rotatably mounted on each spindle, a rack fixed to the wheel, a gear case above the knuckle mounting, a shaft rotatable in the gear case concentrically with the knuckle mounting, a beveled pinion fixed on said shaft, a driving shaft projected into the gear case, a beveled gear wheel on the driving shaft meshing with the gear wheel on the first-named shaft, a driven shaft rotatable in the gear case, a pinion on said driven shaft meshing with the gear wheel on the first named shaft, and a gear wheel on the opposite end of the driven shaft meshing with the wheel rack.

2. The combination with an axle, of a knuckle pivotally mounted in each end of the axle and provided with a spindle, a ground wheel rotatable on the spindle, a rack on said ground wheel, a spherical gear case mounted above the knuckle and comprising members, one movable within the other, an intermediate shaft mounted in the gear case concentric with the knuckle mounting, a beveled pinion on the intermediate shaft, a drive shaft projected into the gear case, a pinion on the driving shaft meshing with the gear wheel on the intermediate shaft, a driven shaft rotatable in the movable member of the gear case, and gear wheels on the opposite ends of the driven shaft in coöperative engagement with the gear wheel on the driven shaft and with the wheel rack.

3. The combination with an axle, of a knuckle at each end of the axle, a pin pivotally mounting each knuckle on the axle, a ground wheel rotatably mounted on each knuckle, a gear case over each knuckle comprising a divided sphere having a stationary member and a member movable within the stationary member, a drive shaft rotatably mounted in the stationary and spherical member and provided with a pinion, a shaft mounted in the case concentrically with the knuckle pin and having a beveled gear wheel meshing with the driving pinion, a shaft rotatably mounted in the movable spherical member and having a pinion meshing with said beveled gear, and a gear wheel on said shaft meshing with the wheel rack.

4. The combination with an axle, of a knuckle pivotally mounted at each end of the axle and provided with a spindle, a ground wheel having a cupped web comprising a hub, a rack arranged horizontally within the web and fixed thereto, a plate fixed to the knuckle and inclosing the rack, a gear case mounted above the knuckle and comprising fixed and movable members, said movable member having a bearing projected through said plate into the web cup, a shaft rotatable in said bearing, having a gear wheel meshing with said rack, a drive shaft projected into the gear case, and gearing in said case operatively connecting the drive shaft with said first named shaft.

5. The combination with an axle, of a knuckle pivotally mounted in each end of the axle and comprising a spindle, a ground wheel having a cupped web, a hub formed integrally with the web and projecting inwardly and outwardly therefrom, a disk fixed to the knuckle and lying within the web cup and spaced by the inner end of the hub, a rack fixed to the web and inclosed by the disk, a gear case comprising stationary and movable members, a bearing on the movable member projected through the disk into the web cup, a shaft rotatable in the bearing and having a gear wheel at one end meshing with said rack and having a beveled pinion at the opposite end, a shaft in said gear case, a beveled pinion on said shaft meshing with the pinion on the first named shaft, and a drive shaft rotatable in the gear case and having a pinion meshing with the gear wheel on the case shaft.

In testimony whereof I affix my signature in presence of two witnesses.

THEODORE DITMARS.

Witnesses:
LYNN A. ROBINSON,
LETA E. COATS.